United States Patent [19]

Schmidt et al.

[11] 4,421,464
[45] Dec. 20, 1983

[54] LIQUID HELIUM PUMP

[75] Inventors: Kurt Schmidt, Karlsruhe-Waldstadt; Klaus Jentzsch, Stutensee, both of Fed. Rep. of Germany

[73] Assignee: Kernforschungszentrum Karlsruhe Gesellschaft mit beschränkter Haftung, Karlsruhe, Fed. Rep. of Germany

[21] Appl. No.: 139,695

[22] Filed: Apr. 11, 1980

[30] Foreign Application Priority Data

Apr. 14, 1979 [DE] Fed. Rep. of Germany ....... 2915199

[51] Int. Cl.³ .................... F04B 17/04; F04B 45/02
[52] U.S. Cl. ............................ 417/412; 417/417; 417/418; 417/472; 310/27
[58] Field of Search ............... 417/412, 413, 472, 473, 417/417, 418; 310/27, 10; 92/44

[56] References Cited

U.S. PATENT DOCUMENTS 2,669,937  2/1954  Presentey ............................ 417/413
2,926,615  3/1960  Coffey ................................ 417/413

Primary Examiner—Richard E. Gluck
Assistant Examiner—Peter M. Cuomo
Attorney, Agent, or Firm—Spencer & Frank

[57] ABSTRACT

A pump for driving a liquid, particularly liquid helium, has an electromagnetic drive contained in its entirety in the pump housing for generating an axially oriented force to reciprocate the pumping member. The electromagnetic drive has a stationary electromagnet supported in the pump housing and including an annular air gap and an energizing solenoid for generating a magnetic flux in the air gap. The electromagnetic drive further has a coil carrier attached to the pumping member to move therewith as a unit; the coil carrier has a travelling path passing through the air gap and being parallel to the pump axis. Further, a moving coil is mounted on the coil carrier for traversing the magnetic flux in the air gap, whereby an electromagnetic force parallel to the pump axis is exerted on the moving coil for displacing the moving coil, the coil carrier and the pumping member as a unit.

9 Claims, 4 Drawing Figures

LIQUID HELIUM PUMP

BACKGROUND OF THE INVENTION

This invention relates to a pump; more particularly, to a liquid helium pump having a superconductive electromagnetic drive which includes a stationary superconductive energizing solenoid connected to the pump housing and a superconductive element which is movable by means of the field generated by the energizing solenoid and which is fixedly attached to the pumping member proper of the pump.

Pumps of the above-outlined type are needed for driving liquid or supercritical helium in a closed circuit or, in general, for displacing liquid helium.

Particularly in the field of fusion technology, the use and operation of coreless fusion magnets are indispensable. The coils of the fusion magnets—which generate magnetic fields of a flux density in the order of a few Tesla—are constituted by hollow superconductors, which may have a length up to 1,000 m and which are to be cooled with helium which is in a single phase. The displacement of the helium is effected at a pressure above 2.4 bar and at a temperature of approximately 4.2 K. The pressure difference between inlet and outlet is in the order of magnitude of 1 bar. In particular modes of application, such as in installations for testing superconductive hollow conductors as a function of the parameters of the flowing helium, such as pressure and flow quantity, there is further required a constant capacity and a constant pressure difference during the pump cycle. These requirements are not met by known piston pumps driven by an eccentric.

In an article entitled "A Reciprocating Liquid Helium Pump Used for Forced Flow of Supercritical Helium" by G. Krafft et al (Cryogenics, February 1978), there is disclosed a piston pump for driving liquid helium. The pump drive is arranged externally of the cryostat and therefore the piston rod has to pass through the cryostat wall. Such an arrangement requires a vacuumtight and heliumtight seal and is involved with substantial expense. These difficulties are circumvented in another known liquid helium pump described in an article entitled "Heat Transfer by the Circulation of Supercritical Helium" by H. H. Kolm et al (Advances in Cryogenic Engineering, Volume 11, Plenum Press, New York, 1965). In this arrangement, the ferromagnetic piston is, with bellows, accommodated in a pump housing and a solenoid for driving the piston is arranged externally of the pump housing. The pump housing which necessarily is made of a non-magnetic material, on the one hand, increases the gap between the solenoid and the piston and, on the other hand, it does not eliminate undesired effects of foreign (external) magnetic fields. It is another disadvantage of this type of pump that it has only a small output of approximately 6.4 $cm^3/s$.

In an article entitled "An Electrically Pumped Liquid Helium Transfer System" by B. Darrel et al (Advances in Cryogenic Engineering, Volume 11, Plenum Press, New York, 1965), there is disclosed a liquid helium pump wherein the superconductive driving coil is a disc coil mounted at an end of a bellows-equipped superconductive piston received in the pump housing. The piston is moved by the driving coil by attraction and repulsion. The forces exerted on the piston change substantially during each stroke, because as the distance between the piston and the driving coil increases, the forces exerted on the piston drop sharply. Further, in this type of pump too, strong foreign magnetic fields may significantly interfere with the pumping operation. The output of this pump too, is low; it is only approximately 7 $cm^3/s$.

In the Handbuch für Hochfrequenz- und Elektrotechniker, (Manual for the High Frequency Technician and Electrotechnician), Volume 1 3rd Edition (published by Verlag für Radio- Foto- Kinotechnik Berlin, 1952), on pages 438 and 439 there is described a drive system for an electromagnetic loudspeaker. The drive system comprises a pot-shaped electromagnet having a central core which carries an energizing solenoid and the free end of which forms, with a disc-shaped pole shoe, an annular gap into which swings the voice coil for moving the loudspeaker diaphragm when the voice coil is excited with a voltage in the sound frequency range.

SUMMARY OF THE INVENTION

It is an object of the invention to provide an improved pump, particularly a liquid helium pump whose superconductive driving arrangement is free from structural components passing through the pump housing; further, which is capable of an interference-free operation even in strong foreign magnetic fields of a flux of several Tesla and which, at a given appropriate capacity has a constant differential pressure between the pump inlet and the pump outlet and thus has a constant flow rate.

This object and others to become apparent as the specification progresses, are achieved by the invention, according to which, briefly stated, the pump has an electromagnetic drive contained in its entirety in the pump housing for generating an axially oriented force to reciprocate the pumping member. The electromagnetic drive has a stationary electromagnet supported in the pump housing and including an annular air gap and an energizing solenoid for generating a magnetic flux in the air gap. The electromagnetic drive further has a coil carrier attached to the pumping member to move therewith as a unit; the coil carrier has a travelling path passing through the air gap and being parallel to the pump axis. Further, a moving coil is mounted on the coil carrier for traversing the magnetic flux in the air gap, whereby an electromagnetic force parallel to the pump axis is exerted on the moving coil for displacing the moving coil, the coil carrier and the pumping member as a unit.

The advantages of the invention reside particularly in that by simple means a compact liquid helium pump is provided which has a large capacity, a constant flow rate and which operates reliably even in strong foreign magnetic fields.

DESCRIPTION OF THE PREFERRED EMBODIMENTS

Figure 1:
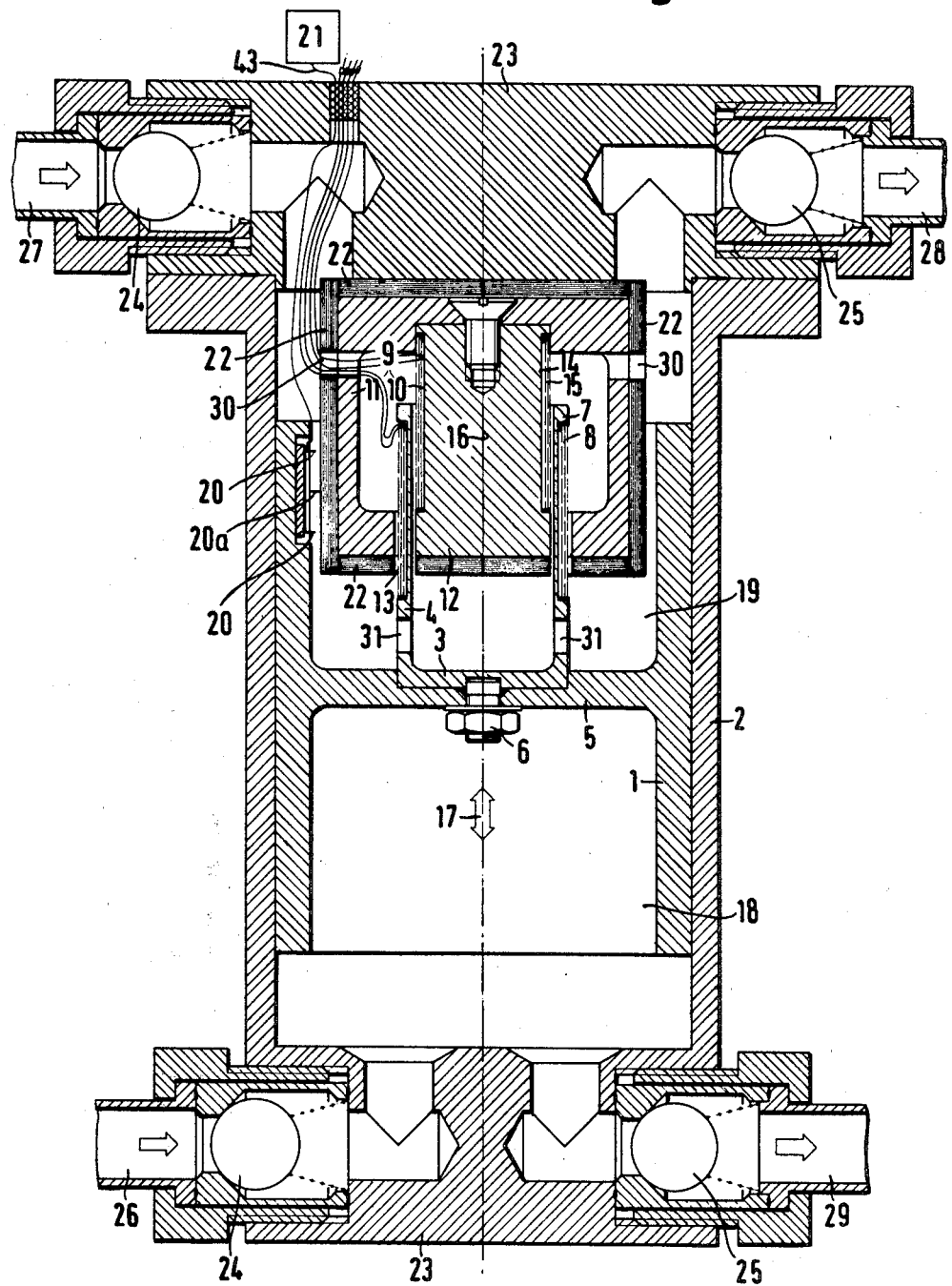
FIGS. 1 through 4 are schematic axial sectional views of four preferred embodiments of the invention.

Turning now to FIG. 1, there is shown, in axial section, a piston pump having an electromagnetically driven double-acting piston 1 arranged in a pump housing 2. The base 3 of a sleeve-like coil carrier 4 is attached to a central septum 5 of the piston 1 by a screw connection 6. The coil carrier 4 has, at its outer surface, a depression constituting a winding space 7 which accommodates a superconductive moving coil 8. An electromagnet 9 comprising a cylindrical ferromagnetic core 10 and a pot-like yoke 11 surrounding the core 10 is arranged within the pump housing 2 and is attached fixedly thereto in a coaxial relationship with the coil carrier 4. The yoke 11 forms an annular gap 13 with the free end 12 of the core 10. The lateral outer face of core 10 has a depression constituting an annular winding space 14 which receives a superconductive energizing solenoid 15 arranged coaxially with the moving coil 8. In the annular gap 13 the current flowing in the energizing solenoid 15 generates a radial magnetic field whose field lines are, at every location of the annular gap 13, perpendicular to the current flowing in the moving coil 8. As a result, a force 17 which is parallel to the axis 16 of the piston 1 and the direction of which is determined exclusively by the direction of the control current, is exerted on the moving coil 8 and thus, with the intermediary of the coil carrier 4, on the piston 1. The superconductive electromagnetic drive of the piston 1 is arranged in one of its two piston chambers 18 and 19 separated by the septum 5 and is cooled by the helium flow generated by the operation of the pump.

In case of constant flux in the annular gap 13, the force 17 exerted on the piston 1 is proportionate to the control current flowing in the moving coil 8. In case of constant control current, the force 17 is constant during each stroke and thus the pressure difference generated by the pump is also constant. Only upon reaching either dead center of the piston 1 does the pressure difference drop to zero for a period of approximately 10 ms. As the piston 1 reaches either of its two dead centers, a respective movable contact 20 carried by the piston 1 engages a stationary contact 20a mounted on the yoke 11, whereby a circuit of a control device 21 is closed, resulting in a reversal of the direction of the control current in the moving coil 8.

A predetermined pressure difference can be set by an appropriate choice of the control current intensity.

The coil carrier 4, similarly to the pump housing 2 and the piston 1, is made of a non-magnetic material such as brass or stainless steel.

If the magnet 9 is, while maintaining the annular gap 13 free, surrounded at all sides by a superconductive shield 22, for example, of $Nb_3Sn$, the pump can be operated interference-free even in a strong external magnetic field having a magnetic flux density of several Tesla. The pump housing 2 is closed at opposite ends by closures 23 flanged thereto; in each closure 23 there is provided a spherical inlet check valve 24 and a spherical outlet check valve 25. As the piston 1 reciprocates in response to the driving effect of the force 17, liquid helium is alternatingly drawn through the respective inlet check valves 24 from supply conduits 26 and 27 and is alternatingly driven through the respective outlet check valve 25 into pressure conduits 28 and 29.

The magnetic flux in the annular gap 13 is approximately B=2 Tesla (iron saturation) for a pump with the following characteristics:
 diameter of piston 1 = 60 mm;
 stroke of piston 1 = 15 mm;
 inner diameter of moving coil 8 = 25 mm;
 length of moving coil 8 = 22 mm;
 the winding of the moving coil 8 has a thickness of 1 mm; it is in three layers with 66 turns each;
 width of air gap 13 = 2 mm;
 height of air gap 13 = 5 mm;
 the winding of the energizing solenoid 15 has two layers with 60 turns each;
 the superconductor for both the moving coil 8 and the energizing solenoid 15 is a copper-stabilized NbTi-multifilament wire of 0.3 mm diameter.

With a current J=20 A in the moving coil 8 and a conductor length L=3.5 m in the annular gap 13, the piston 1 is exposed to an axial force $F = J \times B \times L = 140$ N and in case of a piston surface of 29 cm², there is obtained a differential pressure of $\Delta p = 0.5$ bar. The pressure difference may be increased without difficulty, since the assumed current of 20 A is far below the critical current intensity of the superconductor. In case of a frequency of 2.5 Hz, the capacity is 0.2 liter/sec.

The yoke 11 of the magnet 9 and the magnetic shield 22 have radial ports 30 and the solenoid carrier 4 has, adjacent its bottom 3, radial ports 31. During operation of the pump, a continuous helium flow is maintained through the ports 30 and 31 in the zone of the superconductive moving coil 8 and the superconductive energizing coil 15.

Figure 2:
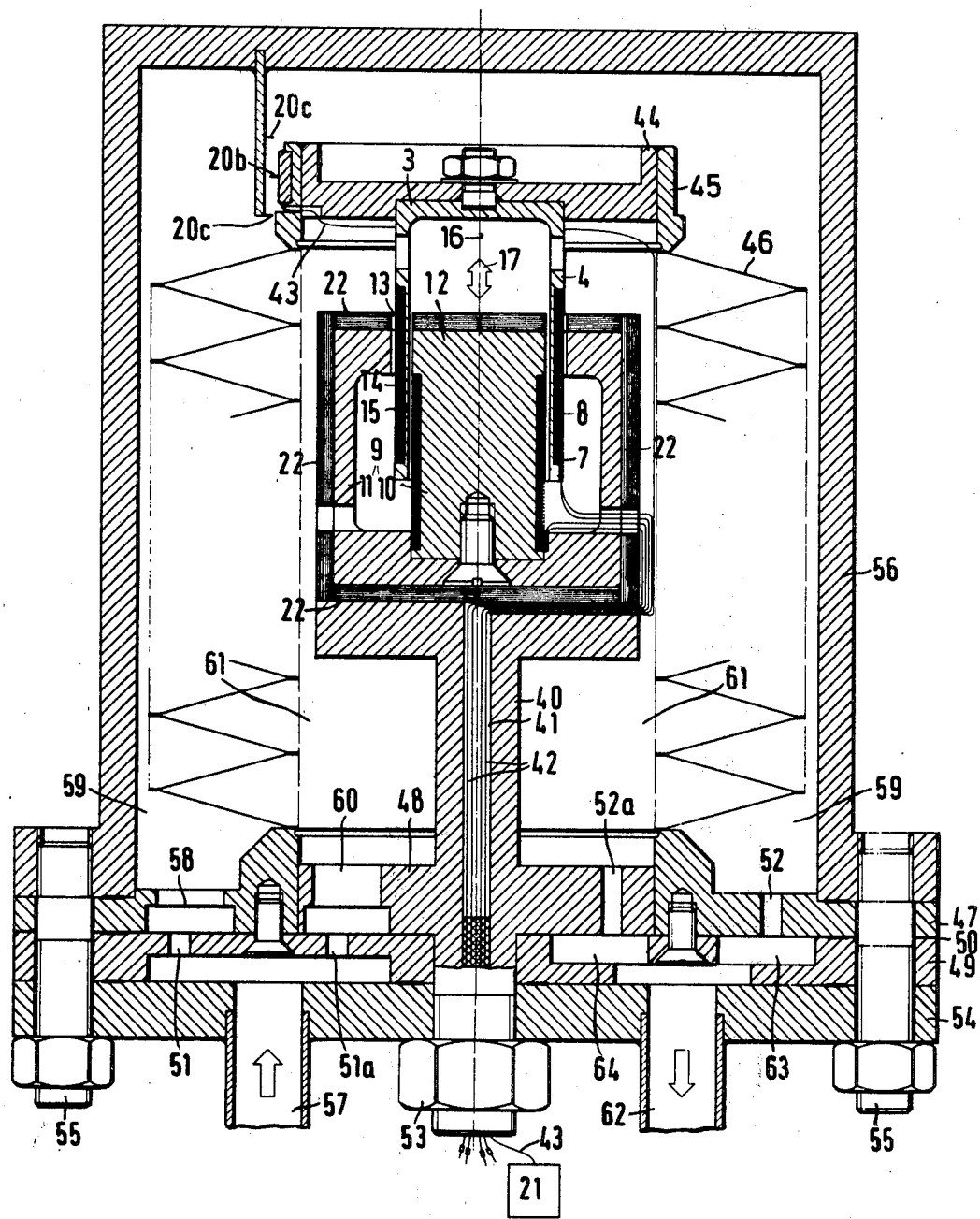

Turning now to FIG. 2, there is shown in axial section a bellows pump whose superconductive electromagnetic drive 3, 4, 7–16, 20, 21 and 22 is substantially identical to the electromagnetic drive described in connection with the embodiment illustrated in FIG. 1.

The yoke 11 of the magnet 9 of the bellows pump shown in FIG. 2 is connected with a support 40 which has a central bore 41 through which passes a current supply cable 42 for the moving coil 8 and the energizing solenoid 15. The pump has a pumping bellows 46 which at its movable upper end (as viewed in FIG. 2) is affixed to a ring 45 to which there is coaxially welded a closure plate 44 mounted on the base 3 of the coil carrier 4, for example, by means of a screw connection. On the ring 45 there is supported a movable contact 20b which cooperates, identically to the embodiment described in connection with FIG. 1, alternatingly with the one and the other stationary contact 20c supported in the pump housing 56. Each time the bellows 46 reaches its compressed or expanded limit position, the movable contact 20b engages the one or the other stationary contact 20c and thus, with the intermediary of a conductor 43 also passing through the bore 41 of the support 40, closes a circuit of the control device 21 for reversing the control current flowing in the moving coil 8 supported on the coil carrier 4.

The lower, fixed end of the bellows 46 is adjoined by a first valve disc 47 which surrounds a foot 48 of the support 40. Between the first valve disc 47 and a second valve disc 49 there is clamped a low-temperature resistant plastic foil 50 constituting a valve diaphragm. The valve diaphragm has non-illustrated tongues (segments) which are actuated by the flowing helium and which thus operate as flutter valves. The diaphragm tongues, dependent upon the direction of the force 17 acting on the moving coil 8, alternatingly open first valve ports 51, 51a provided in second valve disc 49 for allowing inflow of helium from a supply conduit 57 and second valve ports 52, 52a provided in the first valve disc 47 and the foot 48 of the support 40 for driving the helium into the outlet (pressure) conduit 62.

The support 40, the first valve disc 47 and the second valve disc 49 are, together with the valve diaphragm 50, affixed to a base plate 54 by a screw connection 53 and are mounted, together with the base plate 54 on the pump housing 56 by means of bolts 55. Thus, the helium flows from the inlet conduit 57, through the valve port 51 and an opening 58 in the valve disc 47 into the space 59 between the pump housing 56 and the bellows 46 and through the valve port 51a and an opening 60 in the foot 48 of the support 40 into the space 61 surrounded by the bellows 46. The outlet pressure conduit 62 communicates with the space 59 through valve port 52 and an opening 63 in the valve plate 49 and further, the outlet conduit 62 communicates with the space 61 through the valve port 52a and an opening 64 in the valve plate 49.

Figure 3:
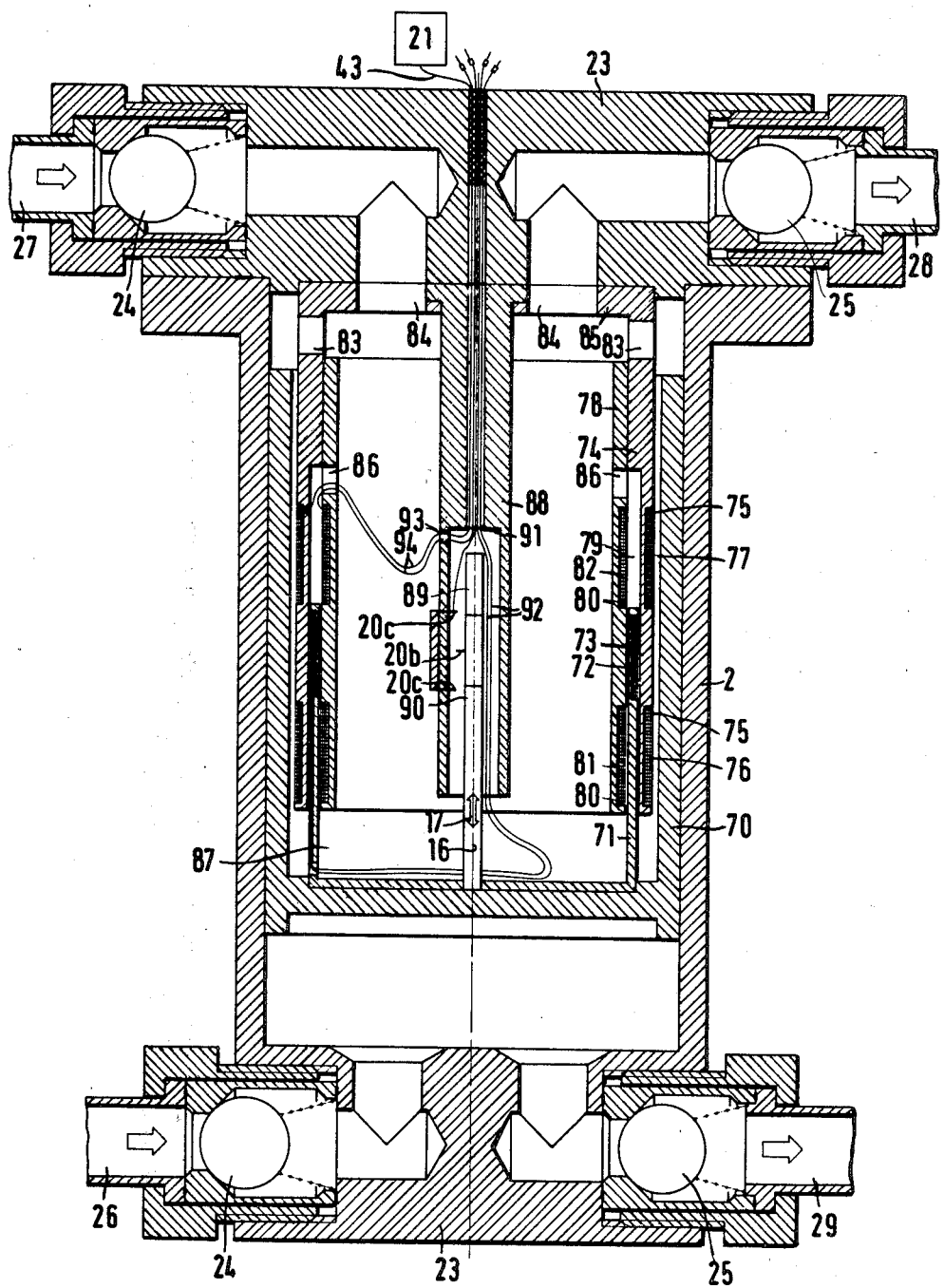

Turning now to the embodiment illustrated in FIG. 3, there is shown a piston pump which is driven with the aid of an iron-free magnet having an annular gap. In the pump housing 2 there is accommodated a pot-shaped piston 70 in which there is fixedly attached a sleeve-shaped coil carrier 71. The latter has, at its open end, an annular groove-shaped winding space 72 for receiving a superconductive moving coil 73.

To the upper housing closure 23 there is fixedly attached a pot-shaped further coil carrier 74 which, at its outer face, has two annular groove-shaped winding spaces 75 for receiving two axially spaced energizing solenoids 76 and 77.

A further, tubular coil carrier 78 is inserted coaxially into the coil carrier 74 and is connected with the latter in such a manner that there is formed an annular gap 79, through which the coil carrier 71 may travel. On the outside of the coil carrier 78 there are provided two annular groove-shaped winding spaces 80 for receiving respective, axially spaced energizing coils 81 and 82. The axial distance between the energizing coils 76 and 77 and between the energizing coils 81 and 82 corresponds approximately to the axial length of the moving coil 73. The coil carriers 71, 74 and 78 are made of a non-magnetic, low-temperature resistant material.

The coil carrier 74 has a base 85 (oriented towards the upper housing closure 23 as viewed in FIG. 3) which is provided with ports 84. The sleeve-shaped portion of the coil carrier 74 has ports 83 located adjacent the base 85. Further, the coil carrier 78 has bores 86 in a zone adjacent the upper winding space 80, as viewed in FIG. 3. The bores 86 establish communication between the annular gap 79 and a space 87 which is defined by the piston 70 and the base 85 of the coil carrier 74 and whose volume is variable by the stroke of the piston 70.

In the center of the base 85 of the coil carrier 74 there is coaxially arranged a guide rod 88 which projects into the space 87 and which has, at its tubular free end, a slot 89 which extends parallel to the pump axis 16. The slot 89 guides a flat web 90 connected with the coil carrier 71, whereby rotations of the moving coil 73 mounted on the coil carrier 71 cannot occur about the axis 16. In this manner it is ensured that the superconductive lead wires 92 which are associated with the moving coil 73 and which pass through an axial bore 91 of the guide rod 88 as well as the tubular end portion thereof are not damaged by an undesired rotary motion of the coil carrier 71. The guide rod 88 has, in its tubular part, a radial bore 93 through which pass two further superconductive wires 94 which are also accommodated in the axial bore 91 of the guide rod 88 and which serve as lead wires for the energizing solenoids 76, 77, 81 and 82.

The guide rod 88 and the flat web 90 may be a fiberglass-reinforced plastic or a ceramic material, while the other structural elements are made of a non-magnetic metallic material.

In the embodiment illustrated in FIG. 3, the annular gap magnet 9 of FIG. 1 is thus replaced by an arrangement which has four superconductive iron-free energizing solenoids and wherein the direction of the energizing current is the same in radially adjacent energizing coils while it is opposed in axially adjacent energizing coils. Under these conditions, the described solenoid arrangement generates in its radial symmetry plane a radial magnetic field which exerts on the moving coil a force that corresponds to that derived from a magnet with an annular gap (such as the magnet 9).

The principal data of a liquid helium pump provided with a drive system in accordance with FIG. 3 may be as follows:

diameter of piston 70=60 mm;
stroke of piston 70=10 mm;
inner diameter of moving coil 73=45 mm;
axial length of moving coil 73=12 mm;
the winding of the moving coil 73 is in two layers with 36 turns each; the wire is a copper-stabilized NbTi-multiplication wire having a diameter of 0.3 mm;
the energizing solenoids 76, 77, 81 and 82 have a total of 420 turns of a superconductive wire having a diameter of 0.3 mm.

At a current of 50 A a radial magnetic field of B=0.25 to 0.4 Tesla is generated at the location of the moving coil 73. The average field affecting the moving coil 73 is, up to ±5 mm excursion, constant within 3% and has a flux of 0.29 Tesla. The axial force exerted on the piston 70 is F=150 N; the differential pressure is $\Delta p$=0.5 bar. At a frequency of 3.5 Hz the capacity is 0.2 liter/sec.

A liquid helium pump equipped with the above-described drive comprising four iron-free energizing coils and an iron-free moving coil can also operate interference-free without a magnetic shield in a homogeneous external magnetic field which is parallel to the coil axis (piston axis 16) and which has a flux of several Tesla or in a non-homogeneous magnetic field which is symmetrical to the coal axis.

Figure 4:
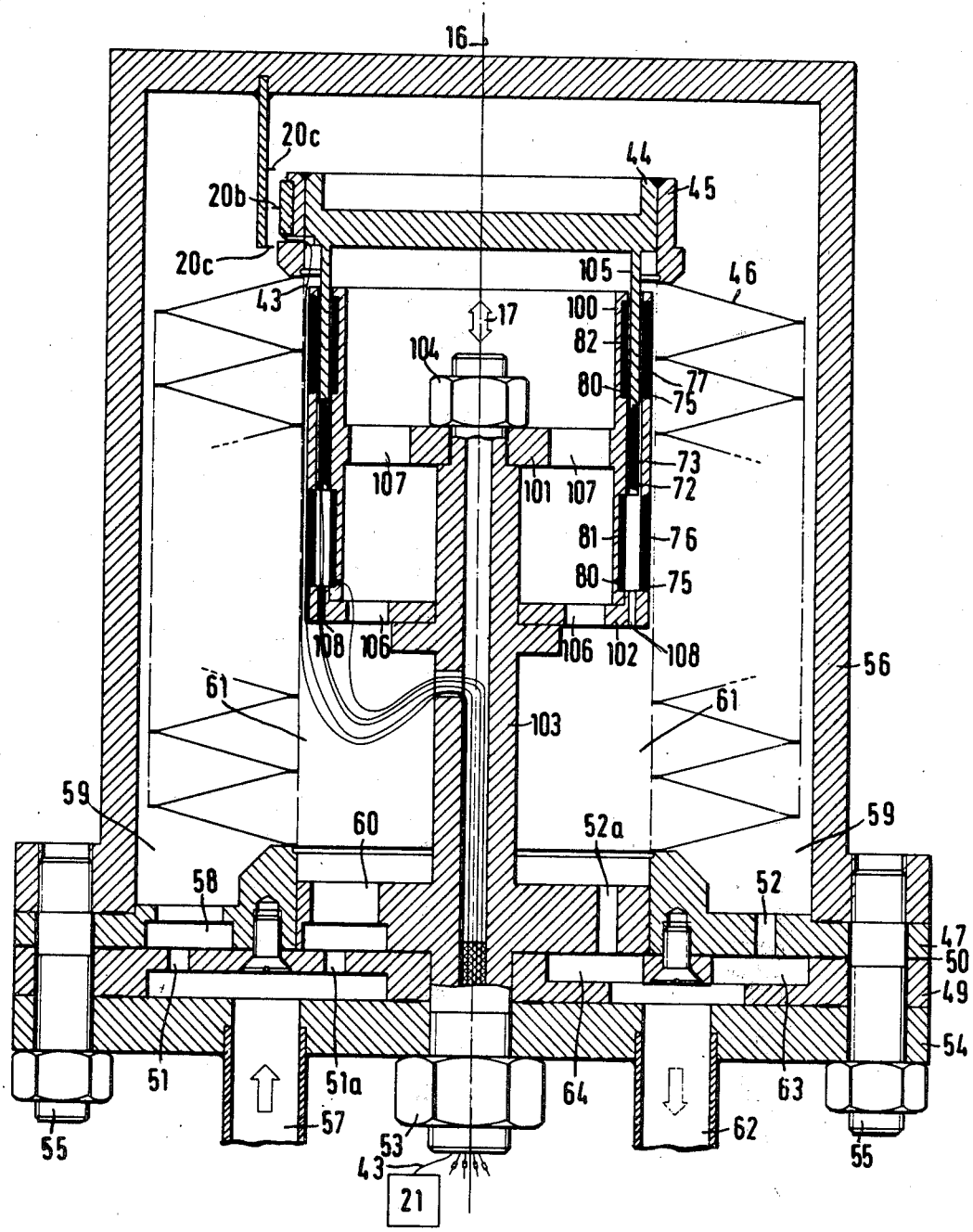

Turning now to the embodiment illustrated in FIG. 4, there is shown, in longitudinal section, a bellows pump which is driven by an arrangement which is described in connection with the FIG. 3 and which thus has four iron-free energizing solenoids 76, 77, 81 and 82 as well as an iron-free moving coil 73. The pump housing 56, the flange 54, the first valve disc 47, the second valve disc 49, the valve diaphragm 50 and the screw connection 53 correspond to the components described in connection with the embodiment illustrated in FIG. 2. The same applies to the structure, the basic spatial arrangement and the function of the iron-free energizing solenoids 76, 77, 81 and 82 and the iron-free moving coil 73. In this embodiment, the energizing coils 81 and 82 are arranged in respective annular groove-shaped winding spaces 80 provided in the outer face of a coil carrier 100 which is of tubular configuration and which has in its central transverse plane an apertured septum 101. The energizing coils 76 and 77 are accommodated in annular groove-shaped winding spaces 75 provided in the outer face of a pot-shaped coil carrier 102. The latter is inserted on a support 103 and is held by the coil carrier 100 attached to the end of the support 103 by means of a screw connection 104. The coil carriers 100 and 102 are centered to be in alignment with the common axis 16 and together define an annular gap in which reciprocates a coil carrier 105 arranged coaxially with the annular gap. In the outer face of the coil carrier 105 there is provided an annular groove-shaped winding space 72 for accommodating the moving coil 73.

The coil carrier 105 is, at its upper end, attached to the closure plate 44 which, in turn, is secured to the upper end of the bellows 46 by means of the ring 45. The other, lower end of the bellows 46 is welded to the first valve disc 47.

The base of the coil carrier 102 has openings 106 and the septum 101 of the coil carrier 100 has openings 107 through which liquid helium may flow during the operation of the pump. A plurality of bores 108 along the radius of the annular gap between the coil carriers 100 and 102 ensures a cooling of the energizing coils and the moving coil.

It will be understood that the above description of the present invention is susceptible to various modifications, changes and adaptations, and the same are intended to be comprehended within the meaning and range of equivalents of the appended claims.

What is claimed is:

1. In a pump for driving liquid helium, including a pump housing having means defining a pump inlet and a pump outlet; a pumping member arranged in the housing for reciprocating motion parallel to a pump axis for drawing liquid helium into the pump through the pump inlet and driving liquid helium out of the pump through the pump outlet; and an electromagnetic drive means contained in its entirety in the pump housing for generating an axially oriented force applied to the pumping member to reciprocate the same; the improvement wherein said electromagnetic drive means comprises:
   (a) a stationary electromagnet supported in said pump housing and including
      (1) non-magnetic first and second coil carriers fixedly supported in said pump housing and surrounding said axis; said second coil carrier coaxially surrounding said first coil carrier and defining therewith an annular clearance constituting an air gap surrounding said axis and having a length dimension parallel to said axis;
      (2) first, second, third and fourth superconductive energizing solenoids carrying an energizing current to generate a magnetic flux in said air gap; said first and second energizing solenoids being mounted in an axially spaced relationship on said first coil carrier; said third and fourth energizing solenoids being mounted in an axially spaced relationship on said second coil carrier; said first energizing solenoid being in radial alignment with said third energizing solenoid and said second energizing solenoid being in radial alignment with said fourth energizing solenoid;
   (b) a non-magnetic third coil carrier attached to said pumping member to move therewith as unit; said third coil carrier surrounding said axis and having a travelling path passing through said air gap and being parallel to said axis;
   (c) a superconductive cylindrical moving coil carrying a control current and being mounted on said third coil carrier coaxially with said first, second, third and fourth energizing solenoids for traversing the magnetic flux in said air gap whereby an electromagnetic force parallel to said axis is exerted on said moving coil for displacing said moving coil, said third coil carrier and said pumping member as a unit; said moving coil having an axial length which is at least approximately equal to the axial distance between said first and second energizing solenoids; and
   (d) means for supplying first, second, third and fourth energizing solenoids and said moving coil with said energizing current and said control current, respectively.

2. A pump as defined in claim 1, wherein said pumping member is a hollow piston surrounding said electromagnetic drive means; further comprising a guide rod stationarily supported in said pump housing and extending into said hollow piston in a coaxial relationship therewith; further wherein said guide rod terminates in a free tubular portion having an axially parallel slot; further comprising a web affixed to said third coil carrier and extending into said slot for being linearly guided by said slot to prevent rotation of said first coil carrier about said axis.

3. A pump as defined in claim 1, wherein said pumping member is a hollow piston surrounding said electromagnetic drive means, further wherein said second coil carrier is sleeve-shaped and has a base; the improvement further comprising means defining ports in said second coil carrier in the zone of said base and in said first coil carrier in the zone of said air gap; said ports providing a flow path between said pump inlet and said pump outlet; said cylindrical moving coil and said energizing solenoids being arranged in said flow path for exposure to the liquid helium driven by the pump.

4. A pump as defined in claim 1, wherein said first coil carrier is tubular and said second coil carrier is pot-shaped; said first coil carrier being affixed to said second coil carrier in the interior thereof and in a coaxial relationship therewith.

5. A pump as defined in claim 4, wherein said first, second and third coil carriers each have an outer face; the improvement further comprising means defining in said outer face separate annular grooves constituting winding spaces for accommodating, respectively, said first and second energizing solenoids, said third and fourth energizing solenoids and said moving coil.

6. A pump as defined in claim 1, wherein said pumping member is a bellows having a fixed end and a movable end; further wherein said electromagnetic drive means is accommodated in a space enclosed by said bellows; further comprising a support fixedly held by said pump housing and extending axially into the space surrounded by said bellows; said third coil carrier being affixed to said movble end of said bellows; said first coil carrier being sleeve-shaped and having a centrally located septum extending transversely to said axis; said first coil carrier being affixed to said support at said septum; said second coil carrier being pot-shaped and being mounted on said support.

7. A pump as defined in claim 6, further comprising means defining ports in said septum and in said pot-shaped second coil carrier for providing a flow path between said pump inlet and said pump outlet.

8. A pump as defined in claim 7, wherein said third coil carrier is sleeve-shaped and has a terminus projecting beyond said air gap; further comprising a closure plate affixed to said movable end of said bellows for closing off the space surrounded by said bellows; said third coil carrier being attached to said closure plate at said terminus of said third coil carrier.

9. A pump as defined in claim 8, further comprising a ring surrounding said closure plate; said ring being affixed to said closure plate and to said movable end of said bellows for mounting said closure plate on said bellows.

* * * * *